United States Patent Office 2,766,284
Patented Oct. 9, 1956

2,766,284
POLYNUCLEAR PHENYL SULFONAMIDES

Wilbur J. Shenk, Jr., Shaker Heights, Ohio, assignor to The Harshaw Chemical Company, Cleveland, Ohio, a corporation of Ohio No Drawing. Application May 11, 1953,
Serial No. 354,376

5 Claims. (Cl. 260—556)

This invention relates to new chemical compositions and their preparation and more particularly to new complex aromatic sulfonyl compounds and methods of preparing them.

It is an object of the present invention to prepare (1) p,p'-oxy-bis (dibenzene sulfonamide), (2) N,N'-bis-(phenyl sulfonyl)-4,4'-biphenyl disulfonamide and the dichloro, dibromo, dimethyl, diethyl, dipropyl, dibutyl and dimethoxy derivatives thereof and salts of the foregoing and compounds corresponding to (1) or its said derivatives and salts wherein the ether oxygen is replaced by S or $CH_2$.

Other objectives and advantages of this invention will become apparent from the following description.

The structure of the above named compounds can be seen from the following examples which show the formulae for the two first named which are respectively:

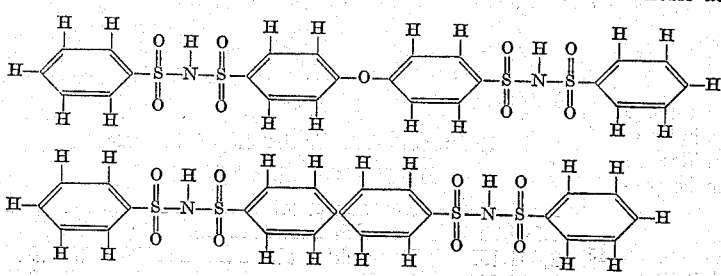

In the preparation of p,p'-oxy-bis (dibenzene sulfonamide), diphenyl ether is reacted with chlorosulfonic acid modified with sodium chloride to form p,p'-oxy-bis (benzene sulfonyl chloride) which is in turn reacted with benzene sulfonamide (sodium salt). The preparation of N,N'-bis-(phenyl sulfonyl)-4,4'-biphenyl disulfonamide is carried out in essentially the same way except that biphenyl is employed in place of diphenyl ether. For the diphenyl ether I may substitute diphenyl sulfide or diphenyl methane. Various substitution products such as chloro, bromo, methyl, ethyl, propyl, butyl, methoxy, etc. are prepared in the same manner by utilizing instead of benzene sulfonamide a suitable substituted benzene sulfonamide. The substituent would, of course, not be on the sulfonamide group but would be on the ring.

The compound p,p'-oxy-bis (dibenzene sulfonamide) is a white granular powder melting at 219° C. to 221.5° C., apparent density 0.61 gram per centimeter. The compound N,N'-bis(phenyl sulfonyl)-4,4'-biphenyl disulfonamide is a white to light tan granular powder of apparent density 0.538 gram per cubic centimeter, melting at 244 to 247° C. The potassium salt of the compound N,N'-bis-(phenyl sulfonyl) diphenyl sulfide-4,4' disulfonamide is a white powder melting at 157.5° C. to 159° C. The compound p,p'-methylene-bis (dibenzene sulfonamide) is a light green powder melting at 171° C. to 177° C.

The above described compounds and derivatives are useful as additives in plating solutions for imparting brightness to electrodeposits. They are useful for example in nickel electrodeposition in connection with triaminotriphenyl methane.

The following examples will serve to illustrate the invention:

Example I

Twenty-four mols of sodium chloride were added to 120 mols of chlorosulfonic acid over a two-hour period. Considerable foaming occurred. Twelve mols of diphenyl ether were then added with stirring over an eight-hour period at a temperature in the range from 10° C. to 15° C. The stirring was continued over night, the mixture being allowed to warm to room temperature. The reaction mixture was drowned in 28 kg. of crushed ice and 8 liters of water with vigorous agitation. The mixture was stirred for one-half hour at 5° C. and the crude p,p'-oxy-bis (benzene sulfonyl chloride) was then collected on a filter. A 20% solution of benzene sulfonamide was prepared by dissolving 35 mols of benzene sulfonamide in 35 mols of caustic soda in 24 kg. of water. To this solution was added with stirring 15.7 mols of the crude disulfonyl chloride over a period of 3 hours at from 75° C. to 80° C. The pH was maintained at 9 to 10 by suitable additions of caustic soda. The mixture was stirred an additional two hours and diluted to 22 gallons with water and ice. The pH was adjusted to 2.5 with hydrochloric acid. The mixture was filtered at 20° C. to remove excess benzene sulfonamide. The solution was made 5% hydrochloric acid by weight by dropwise addition of 11.8 liters of concentrated hydrochloric acid over a period of ¾ hour at 60° C. to 70° C. and then was allowed to cool and was filtered. The overall yield of p,p'-(oxy)-bis-(dibenzene sulfonamide), melting point 219-221.5° C. was 41.3%.

By substituting chlorobenzene sulfonamide or toluene sulfonamide or bromobenzene sulfonamide or alkyl (up to 4 carbon atoms) substituted benzene sulfonamides the corresponding halogen and alkyl derivatives can be prepared as above.

Example II

Twelve mols of sodium chloride were added to 60 mols of chlorosulfonic acid over a period of 35 minutes. Considerable foaming occurred. Six mols of biphenyl were added in 25 minutes at 50° C. to 80° C. The reaction mixture was stirred at 50° C. for 5 hours and allowed to cool to room temperature overnight. The reaction mixture was drowned in 18 kg. of crushed ice and 4 liters of cold water. The mixture was stirred for one-half hour at 8° C. and the crude disulfonyl chloride was collected by filtration. A 20% solution of benzene sulfonamide was prepared by dissolving 13.1 mols of benzene sulfonamide in 13.1 mols of caustic soda in 7680 cc. of water. The solution was heated to 50° C. with agitation and filtered. To this solution was added simultaneously at 75° C. to 80° C., 5.7 mols of the crude disulfonyl chloride and 11.4 mols caustic soda (as 40% solution). The addition time was 105 minutes, the pH about 10. The reaction mixture was stirred 2 hours at 75° C. to 80° C., diluted to 7.5 gallons and adjusted to 20° C. by the use of water and ice, and 370 cc. of a 20% solution of hydrochloric acid was added. The mixture was filtered to remove excess benzene sulfonamide. To the filtrate was added 3.67 liters of 37% HCl, dropwise, in 20 minutes at 60° C. to 70° C. The resulting precipitate was removed and dried. The overall yield of N,N'-bis-(phenyl sulfonyl)-4,4'-biphenyl disulfonamide, melting point 244–247° C., was 72.2%.

By substituting chlorobenzene sulfonamide or toluene sulfonamide or bromobenzene sulfonamide or alkyl (up to 4 carbon atoms) substituted benzene sulfonamides the corresponding halogen and alkyl derivatives can be prepared as above.

Example III

Eight-tenths (0.8) mol of sodium chloride was added to 4 mols of chlorosulfonic acid over a period of 15 minutes. Four-tenths (0.4) mol of diphenyl sulfide was added in 60 minutes at 20° C. to 25° C. The reaction mixture was stirred at 20–25° C. for 3 hours. The reaction mixture was drowned in 1.5 kg. of crushed ice and 0.5 liter of cold water. The product, 4,4'-diphenyl sulfide disulfonyl chloride, was collected on a filter. A solution of benzene sulfonamide was prepared by dissolving 0.2 mol of benzene sulfonamide in 0.2 mol of caustic soda in 150 cc. of water. To this solution at 35–45° C., 0.05 mol of the disulfonyl chloride was added in 30 minutes, the final pH being about 10. After stirring for one hour the reaction mixture was diluted to 350 cc. and cooled to 20° C. by the use of water and ice. The pH was then adjusted to 2.5 with dilute hydrochloric acid and the reaction mixture was filtered. To the filtrate sufficient concentrated hydrochloric acid was added to make it 5% hydrochloric acid by weight. The resulting precipitates was collected and dissolved in 500 cc. H₂O, neutralized with dilute caustic potash solution and the potassium salt of N,N'-bis(phenyl sulfonyl)-4,4'-diphenyl sulfide disulfonamide was salted out with a saturated potassium chloride solution at 100° C. The product was filtered at 10° C. and dried. Overall yield 34.2%.

By substituting chlorobenzene sulfonamide to toluene sulfonamide or bromobenzene sulfonamide or alkyl (up to 4 carbon atoms) substituted benzene sulfonamides the corresponding halogen and alkyl derivatives can be prepared as above.

Example IV

To three mols of chlorosulfonic acid 0.5 mol of diphenyl methane was gradually added with stirring. Reaction is rapid and exothermic and cooling with an ice bath was required to maintain the temperature at 30° C. After the addition was complete the solution was stirred for 2.5 hours at 25° C. and then poured onto 1500 cc. of cracked ice and water. The crude disulfonyl chloride separated as a fine tan powder and was washed with water by decantation. It was then dissolved in benzene and reprecipitated by the addition of petroleum ether. The 4,4'-diphenyl methane-disulfonyl chloride, melting point 109–120° C. thus obtained was then added over a period of 30 minutes to a solution of 0.31 mol of sodium benzene sulfonamide in 250 cc. of water at 50–55° C. After stirring for an additional half hour at this temperature the reaction mixture was heated under reflux for one hour. The product, p,p'-methylene-bis (dibenzenesulfonamide), melting point 171–177° C., was isolated by acidification of the diluted reaction mixture by using a procedure similar to that described in Examples I and II.

By substituting chlorobenzene sulfonamide or toluene sulfonamide or bromobenzene sulfonamide or alkyl (up to 4 carbon atoms) substituted benzene sulfonamides the corresponding halogen and alkyl derivatives can be prepared as above.

Having thus described the invention, what is claimed is:

1. Compounds of the class consisting of (1) p,p'-oxy-bis (dibenzene sulfonamide), (2) N,N'-(phenyl sulfonyl)-4,4'-biphenyl disulfonamide, (3) N,N'-bis-(phenyl sulfonyl)-4,4'-diphenyl sulfide-disulfonamide, (4) p,p'-methylene-bis (dibenzene sulfonamide), and the dichloro, dibromo, dimethoxy, dimethyl, diethyl, dipropyl, and dibutyl derivatives thereof wherein the substituent is on the ring and in organic salts of the foregoing.

2. As a new composition of matter, p,p-oxy-bis (dibenzene sulfonamide).

3. As a new composition of matter, N,N'-bis-(phenyl sulfonyl)-4,4'-biphenyl disulfonamide.

4. As a new composition of matter, N,N'-bis-(phenyl sulfonyl)-diphenyl sulfide-4,4'-disulfonamide.

5. As a new composition of matter, p,p'-methylene-bis (dibenzene sulfonamide).

References Cited in the file of this patent

UNITED STATES PATENTS

| | | |
|---|---|---|
| 2,292,998 | Hentrich et al. | Aug. 11, 1942 |
| 2,345,121 | Hentrich | Mar. 28, 1944 |
| 2,401,155 | Hentrich et al. | May 28, 1946 |
| 2,635,535 | Jennings | Apr. 21, 1953 |

OTHER REFERENCES

Pollak et al.: Chem. Abst., vol. 24, p. 4004 (1930).